(12) United States Patent
Nemoto et al.

(10) Patent No.: US 6,625,864 B2
(45) Date of Patent: Sep. 30, 2003

(54) METHOD FOR MANUFACTURING AN ERECT IMAGE, UNITY MAGNIFICATION, RESIN LENS ARRAY

(75) Inventors: Hiroyuki Nemoto, Osaka (JP); Takashi Kishimoto, Osaka (JP); Kenjiro Hamanaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 113 days.

(21) Appl. No.: 09/800,536

(22) Filed: Mar. 7, 2001

(65) Prior Publication Data
US 2002/0124378 A1 Sep. 12, 2002

Related U.S. Application Data

(62) Division of application No. 09/380,042, filed as application No. PCT/JP98/05851 on Dec. 24, 1998, now Pat. No. 6,363,603.

(30) Foreign Application Priority Data

Dec. 26, 1997 (JP) ............................... 9-359471
Dec. 15, 1998 (JP) ............................. 10-355840

(51) Int. Cl.[7] ................................. B23P 25/00
(52) U.S. Cl. ................. 29/527.2; 29/458; 29/466; 359/365; 359/621; 216/97; 216/49
(58) Field of Search ............................. 216/41, 49, 471, 216/24, 26, 56, 87, 94, 97, 103, 104, 108; 29/450, 428, 446, 464, 466, 527.1, 527.2, 458; 249/114.1, 115, 117, 134, 83; 359/366, 365, 622, 619, 621, 819, 623; 430/320, 321, 312, 326; 205/79, 162, 163, 164, 80, 67, 70, 159, 183; 65/275, 356, 30.13; 156/643

(56) References Cited

U.S. PATENT DOCUMENTS

| | | |
|---|---|---|
| 2,139,855 A | 12/1938 | Genies |
| 2,347,011 A | 4/1944 | Walker |
| 2,879,147 A | 3/1959 | Baker |
| 2,931,027 A | 3/1960 | Blefary et al. |
| 3,484,599 A | 12/1969 | Little |
| 3,687,664 A | 8/1972 | Broadbent |
| 3,994,784 A | 11/1976 | Kapash |
| 4,046,619 A | 9/1977 | Rice et al. |
| 4,247,361 A | 1/1981 | Shaheen |

(List continued on next page.)

FOREIGN PATENT DOCUMENTS

| | | |
|---|---|---|
| JP | 54-120232 A | 9/1979 |
| JP | 57-176010 A | 10/1982 |
| JP | 60-79924 A | 5/1985 |
| JP | 5-192944 A | 8/1993 |
| JP | 8-72064 A | 3/1996 |
| JP | 8-503171 A | 4/1996 |

OTHER PUBLICATIONS

Search Report, Apr. 6, 1999.

*Primary Examiner*—Gregory Vidovich
*Assistant Examiner*—Marc Jimenez
(74) *Attorney, Agent, or Firm*—RatnerPrestia

(57) ABSTRACT

The present invention provides a method for manufacturing an erect image, unity magnification, resin lens array by injection molding. Two injection-molded lens plates are stacked such that convexly warped sides thereof face each other or such that a convexly warped side of the lens plate whose warp is greater than that of the other lens plate faces a concavely warped side of the other lens plate, while directions of resin injection thereof are aligned so as to optically avoid the influence of molding shrinkage. Engagement spigots and engagement sockets are employed in order to align the two lens plates. The two stacked lens plates are secured by clipping of peripheral portions thereof.

15 Claims, 13 Drawing Sheets

U.S. PATENT DOCUMENTS

| | | |
|---|---|---|
| 4,453,289 A | 6/1984 | Kleykamp et al. |
| 4,508,591 A | 4/1985 | Bartlett et al. |
| 4,724,043 A | 2/1988 | Bergendahl et al. |
| 4,732,453 A | 3/1988 | De Montbello et al. |
| 4,797,316 A | 1/1989 | Hecq et al. |
| 4,814,369 A | 3/1989 | Baker |
| 4,842,629 A | 6/1989 | Clemens et al. |
| 4,895,790 A | 1/1990 | Swanson et al. |
| 4,919,388 A | 4/1990 | Koike et al. |
| 5,015,338 A | 5/1991 | Tabuchi et al. |
| 5,018,809 A | 5/1991 | Shin et al. |
| 5,204,126 A | 4/1993 | Singh et al. |
| 5,225,935 A | 7/1993 | Watanabe et al. |
| 5,230,770 A | 7/1993 | Kashiwagi |
| 5,246,531 A | 9/1993 | Junji et al. |
| 5,281,301 A | 1/1994 | Basavanhally |
| 5,298,366 A | 3/1994 | Iwasaki et al. |
| 5,330,880 A | 7/1994 | Horigome et al. |
| 5,444,572 A | 8/1995 | Gal et al. |
| 5,463,498 A | 10/1995 | Gale et al. |
| 5,512,219 A | 4/1996 | Rowland et al. |
| 5,540,746 A | 7/1996 | Sasaki et al. |
| 5,550,663 A * | 8/1996 | Nishizaki et al. .............. 359/95 |
| 5,571,374 A | 11/1996 | Thero et al. |
| 5,587,090 A | 12/1996 | Belcher et al. |
| 5,615,048 A | 3/1997 | Davies et al. |
| 5,636,056 A | 6/1997 | Otpmaga et al. |
| 5,694,246 A | 12/1997 | Aoyama et al. |
| 5,699,131 A | 12/1997 | Aoki et al. |
| 5,706,142 A | 1/1998 | Lee |
| 5,746,800 A | 5/1998 | Ambrogio |
| 5,788,871 A | 8/1998 | Huh |
| 5,822,125 A * | 10/1998 | Meyers ....................... 359/621 |
| 5,838,409 A | 11/1998 | Tomono et al. |
| 5,855,641 A | 1/1999 | Taniguchi |
| 5,866,025 A | 2/1999 | Kataoka et al. |
| 5,868,957 A | 2/1999 | Bordener |
| 5,876,614 A | 3/1999 | Zhou et al. |
| 5,885,316 A | 3/1999 | Sato et al. |
| 5,902,997 A * | 5/1999 | Kropp ........................ 250/216 |
| 5,904,746 A | 5/1999 | Okada |
| 5,926,326 A | 7/1999 | Fischer et al. |
| 5,973,844 A * | 10/1999 | Burger ....................... 359/622 |
| 5,989,008 A | 11/1999 | Wytkin |
| 6,025,268 A | 2/2000 | Shen |
| 6,045,715 A | 4/2000 | Spierings et al. |
| 6,067,137 A | 5/2000 | Ohnishi et al. |
| 6,068,781 A | 5/2000 | Tsuruma |
| 6,069,740 A | 5/2000 | Hamanaka |
| 6,074,546 A | 6/2000 | Sun et al. |
| 6,074,946 A | 6/2000 | Ouellet et al. |
| 6,081,388 A | 6/2000 | Widl |
| 6,090,301 A | 7/2000 | Mizukoshi et al. |
| 6,093,013 A | 7/2000 | Sagrati et al. |
| 6,117,791 A | 9/2000 | Ko et al. |

* cited by examiner (a)

(b)

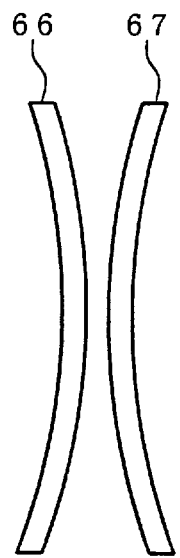
FIG. 9A  FIG. 9B
FIG. 10
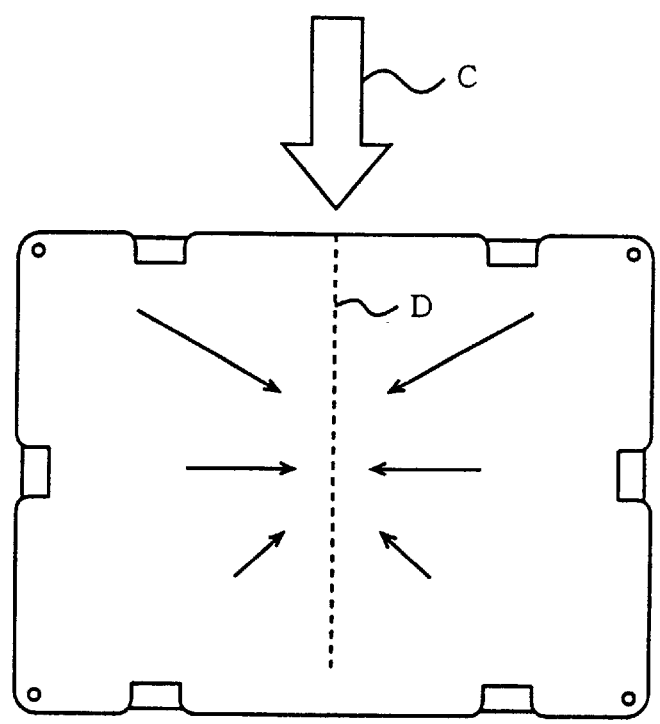

METHOD FOR MANUFACTURING AN ERECT IMAGE, UNITY MAGNIFICATION, RESIN LENS ARRAY

This application is a Divisional Application, claiming the benefit of U.S. patent application Ser. No. 09/380,042, filed Aug. 25, 1999, now U.S. Pat. No. 6,363,603, which is a U.S. National Phase Application of PCT International Application PCT/JP98/05851 filed Dec. 24, 1998.

TECHNICAL FIELD

The present invention relates to an erect image, unity magnification, resin lens array and to a method for manufacturing the same. More particularly, the invention relates to an erect image, unity magnification, resin lens array applicable to a device for spatially transmitting a two-dimensional image and a method for manufacturing the lens array, as well as to a method for manufacturing a mold for use in manufacture of the lens array.

BACKGROUND ART

An erect image, unity magnification lens array used in a copier, facsimile, or printer is disclosed in Japanese Patent Application Laid-Open No. 55-90908. The publication proposes a two-block lens array in which each block includes a number of bar lenslets and the two blocks are arranged so as to face each other. Such a lens array is formed by the steps of, for example, covering with an acrylic resin a lens support in which through holes are bored at positions corresponding to intended bar lenslets; and pressing dies having hemispherical concaves formed therein against the acrylic resin assembly from the opposite side to thereby form end faces of bar lenslets.

Japanese Patent Application Laid-Open No. 64-88502 discloses a lens array including two flat lenses which face each other. Each flat lens is formed by injection molding such that convex lenslets are arrayed in a two-dimensional regular pattern.

FIG. 8 of Japanese Patent Application Laid-Open No. 60-29703 depicts a usually practiced method for manufacturing a microlens array. According to the method, a polymer is deposited on a mold having concaves formed therein in an array, thereby forming the microlens array.

Japanese Patent Application Laid-Open No. 5-150102 discloses a method for manufacturing a microlens array, comprising the steps of: forming a mask layer on a flat plate; forming fine circular openings at intended lenslet positions in the mask layer, in a number equal to the number of intended lenslets; chemically etching the surface of the flat plate through the openings; removing the mask layer; further chemically etching the surface of the flat plate to obtain a mother matrix; fabricating a mold for use in molding a microlens array, by use of the mother matrix; and pressing a glass sheet against the mold (the so-called "2P molding process"), thereby fabricating a microlens array on which convex lenslets are densely formed on one side.

An ordinary resin lens array is intended to converge luminous flux on each of arrayed targets. Accordingly, the accuracy of lenslet pitches must be equivalent to the positional accuracy of the targets. To this end, the resin lens array must be manufactured by the 2P molding process.

An erect image, unity magnification, resin lens array is applicable not only to a copier, facsimile, or printer but also to a two-dimensional image, spatial transmitting device for transmitting a two-dimensional image onto a spatial image plane. A specific example of such a transmitting device is a touchless switch. An erect image, unity magnification, resin lens array for use in such a two-dimensional image, spatial transmitting device is not required to have a high degree of lenslet pitch accuracy so long as the optical axes of at least three stacked hemispherical lenslets are aligned.

The inventors of the present invention carried out extensive studies in an attempt to manufacture an erect image, unity magnification, resin lens array by injection molding, not by a 2P molding process.

An erect image, unity magnification, resin lens array which the present inventors aim to provide includes at least two lens plates, which each have hemispherical lenslets of 0.2 mm to 2.0 mm diameter arrayed in a regular pattern on one or both sides thereof. The lens plates are stacked such that the optical axes of at least three stacked hemispherical lenslets are aligned. The working distance of the intended lens array is not greater than 100 mm. Accordingly, the stacked hemispherical lenslets of the lens plates have a common optical axis, and the common optical axes are in parallel to each other.

As mentioned previously, Japanese Patent Application Laid-Open No. 64-88502 describes that a flat lens array is manufactured by injection molding, but the publication does not disclose a specific procedure therefor. According to Japanese Patent Application Laid-Open No. 5-150102, a Ni mold for use in fabrication of a microlens array is manufactured. However, this Ni mold is not applicable to injection molding which the present inventors aim to provide. In the case where a glass mother matrix is fabricated, if a pinhole is present in a chromium film, glass is etched through the pinhole, resulting in formation of an undesirable pit in the glass mother matrix. As a result, a mold fabricated by use of the glass mother matrix involves a defect.

Further, when a lens plate is manufactured by injection molding, the injection-molded lens plate is warped and suffers molding shrinkage. Therefore, when the warped, shrunk lens plates are assembled into an erect image, unity magnification, resin lens array, there must be devised a measure for rendering the lens array free of distortion.

DISCLOSURE OF THE INVENTION

An object of the present invention is to provide a method for manufacturing an erect image, unity magnification, resin lens array by injection molding through use of a defect-free mold.

Another object of the present invention is to provide an erect image, unity magnification, resin lens array manufactured by the method of the invention.

Still another object of the present invention is to provide a lens plate for use in the aforementioned erect image, unity magnification, resin lens array and a method for manufacturing the lens plate by injection molding.

A further object of the present invention is to provide a mold for use in the aforementioned injection molding and a method for manufacturing the mold.

A still further object of the present invention is to provide a mother matrix for use in manufacture of the aforementioned mold and a method for manufacturing the mother matrix.

A still further object of the present invention is to provide a master matrix for use in manufacture of the aforementioned mother matrix and a method for manufacturing the master matrix.

The erect image, unity magnification, resin lens array of the present invention includes lens plates which each have hemispherical lenslets arrayed in a regular pattern. According to the method of the invention for manufacturing the resin lens array, first there is manufactured a master matrix for a mold for use in injection-molding of the lens plate. The master matrix is manufactured by the steps of: preparing a glass substrate having substantially parallel, flat surfaces; forming an etching resist film on the glass substrate; patterning the etching resist film so as to form fine openings corresponding to the hemispherical lenslets in the etching resist film in a regularly arrayed pattern; isotropically etching the glass substrate while using the patterned etching resist film as a mask, thereby forming concaves in the glass substrate under the corresponding fine openings; removing the patterned etching resist film; further isotropically etching the glass substrate so that the concaves grow and assume a profile corresponding to that of the hemispherical lenslet.

By use of the thus-manufactured master matrix, the mold for use in injection molding is manufactured. A method for manufacturing the mold includes the steps of: applying a parting agent onto the surface of the master matrix on which the concaves are formed; drying the applied parting agent; dropping resin onto the surface of the master matrix; spreading the dropped resin by use of a glass substrate; curing the spread resin; parting the master matrix from an assembly of the cured resin and the glass substrate; forming a conductive film on the surface of the cured resin of the assembly; depositing metal on the conductive film to a predetermined thickness by plating; and parting the resultant metal plating from the assembly to thereby obtain the mold.

Next, a lens plate is manufactured by use of the thus-obtained molds. A method for manufacturing the lens plate includes the steps of: attaching two molds onto a die set such that surfaces having concaves formed therein face each other; establishing a predetermined gap between the facing molds; injecting resin into the gap; and opening the molds apart to remove the lens plate.

Subsequently, the thus-obtained lens plates are assembled into an erect image, unity magnification, resin lens array. The assembling method includes the steps of: stacking two lens plates, which are convexly warped, such that convexly warped sides thereof face each other or face in the same direction while directions of resin injection thereof are aligned; and clipping the lens plates together at clipping portions thereof.

BRIEF DESCRIPTION OF DRAWINGS

FIGS. 9A and 9B are views illustrating a method of stacking lens plates;

FIG. 10 is an explanatory view illustrating molding shrinkage of the lens plate;

BEST MODE FOR CARRYING OUT THE INVENTION

Embodiments of the present invention will next be described in detail with reference to the drawings.

FIGS. 1A to 1H depicts the steps of a procedure for fabricating a glass master matrix. The steps will be sequentially described below.

[1] Fabrication of Glass Master Matrix (a) Preparation of Glass Substrate

Figure 1A:
FIGS. 1A to 1H are views depicting the steps of a process for fabricating a glass master matrix.

As shown in FIG. 1A, a glass substrate 10 having polished, substantially parallel, flat surfaces is prepared. The glass substrate 10 may be of, for example, soda-lime glass or quartz glass. The present embodiment uses quartz glass. The reason for this is to avoid the following problem. If glass contains impurities and is etched in a hydrofluoric acid solution, which will be described later, the impurities in the glass will react with the solution to become fluorides. The thus-produced fluorides, such as barium fluoride and boron fluoride, form precipitates, which hinder circulation of the solution and adhere to the glass surface with a resultant failure to form lenslets of uniform hemispherical surface.

The thickness of the glass substrate 10 is preferably not less than 1.0 mm. The employment of the thickness range prevents breakage of the glass substrate during a later step for parting the glass substrate from a resin body, which breakage might occur due to a reduction in the thickness of the glass substrate caused by etching even though the back surface of the glass substrate is coated with a film resistant to an etchant (hereinafter referred to as an "etching resist film").

(b) Formation of First Etching Resist Film

Figure 1B:
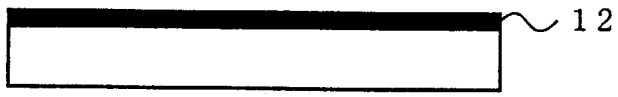

Next, as shown in FIG. 1B, a chrome film (a multilayer film of chromium or chromium oxide) 12, which serves as a first etching resist film, is formed on the upper surface of the quarts glass substrate 10. The thickness of the chrome film 12 is preferably 100 to 5000 angstroms. The employment of the thickness range reduces the possibility of formation of a pinhole in the chrome film 12 caused by remaining abrasive, adhering dust or dirt, or a projection on the glass surface and prevents cracking of the chrome film 12 which might otherwise be induced by a film stress.

(c) Patterning of the Chrome Film

Figure 1C:

Next, as shown in FIG. 1C, a photoresist 14 is applied onto the chrome film 12 to a thickness of about 2 μm and is then exposed to light through a photomask (not shown), followed by development to obtain a patterning resist. Subsequently, the chrome film 12 undergoes reactive ion etching so as to be patterned. Specifically, circular openings of a 3 to 20 μm diameter or polygonal openings of a 3 to 20 μm maximum diameter are formed through the chrome film 12.

The photoresist 14 used for patterning the chrome film 12 is removed, but may be left on the chrome film 12 so as to serve as a second etching resist film. When the photoresist 14 is removed and the glass substrate 10 is etched through the patterned chrome film 12, a pinhole, if any, in the chrome film 12 will cause formation of an undesirable concave in the glass substrate 10. If the photoresist 14 is left unremoved, the pinhole is covered with the photoresist 14, so that such an undesirable concave is not formed in the glass substrate 10.

In order to reduce the possibility of formation of a pinhole in the chrome film 12 caused by a pinhole in the photoresist 14, the following steps (d) and (e) may be added.

(d) Application of Photoresist onto the Second Etching Resist Film

Figure 1D:
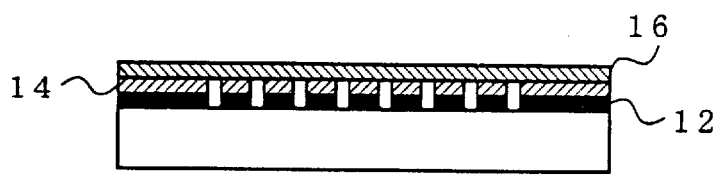

As shown in FIG. 1D, photoresist (positive type) 16 is applied onto the second etching resist film (photoresist) 14 to a thickness of about 2 µm.

Figure 1E:

(e) Patterning of the Photoresist through Exposure Effected from behind Patterned Chrome Film Next, as shown in FIG. 1E, the photoresist 16 is exposed to light emitted from behind the patterned chrome film 12, which serves as a photomask. If a pinhole ($\leq 1$ µm) is formed in the photoresist 14, an associated pinhole is also formed in the chrome film 12 in step (c). The photoresist 16 is exposed to light emitted from behind the chrome film 12 through the pinhole formed in the chrome film 12. However, the diameter of the pinhole is too small to allow an exposed region to expand up to the upper surface of the photoresist 16.

Figure 2A:
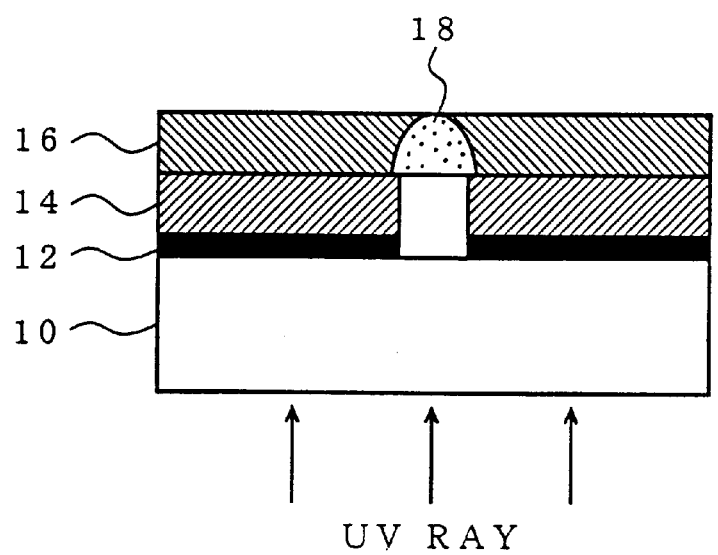
FIGS. 2A and 2B are views illustrating the effect of a pinhole.
Figure 2B:
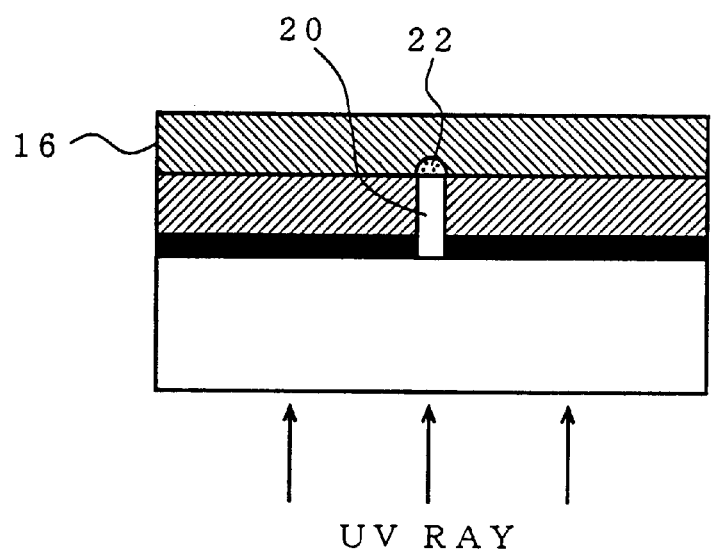

This condition is depicted in FIGS. 2A and 2B. FIG. 2A shows an exposed region 18 in the photoresist 16 when the photoresist 16 is exposed to ultraviolet rays emitted from behind the chrome film 12 through an intended opening of the pattern. The exposed region 18 expands up to the upper surface of the photoresist 16.

FIG. 2B shows an exposed region 22 in the photoresist 16 in the case where a pinhole is formed in the chrome film 12 due to a pinhole 20 present in the photoresist 14 and the photoresist 16 is exposed to ultraviolet rays emitted from behind the chrome film 12 through the pinhole. The exposed region 22 does not reach the upper surface of the photoresist 16.

After the exposure to ultraviolet rays, the photoresist 16 undergoes development. A portion of the photoresist 16 corresponding to the exposed region 18 is removed; however, a portion of the photoresist 16 located above the pinhole 20 is not removed. Accordingly, the photoresist 16 of FIG. 1E is patterned to a desired pattern. Therefore, the thus-patterned photoresist 16 serves as a third etching resist film which prevents the glass substrate 10 from otherwise being etched to a pattern other than a required pattern in the next step.

Alternatively, after the photoresist 14 formed in step (c) is removed, steps similar to steps (d) and (e) may be added so as to form a second etching resist film.

(f) First Glass Etching

Figure 1F:
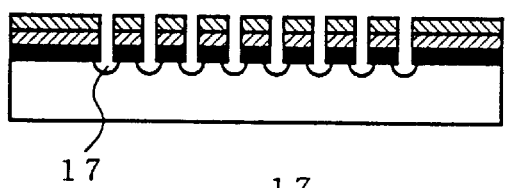

Next, the glass substrate 10 coated with the etching resist films 12, 14, and 16 are immersed in a hydrofluoric acid solution, which serves as an etchant, and undergoes isotropic etching which is effected by the etchant introduced through openings formed in the etching resist films 12, 14, and 16. As a result, as shown in FIG. 1F, concaves 17 are formed in the glass substrate 10.

When the glass substrate 10 was etched for about 80 minutes while the diameter of the opening in the etching resist films 12, 14, and 16 was about 5 µm, the diameter of the formed concave was 153 µm.

(g) Removal of the Etching Resist Films

Figure 1G:
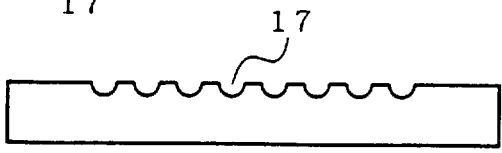

Next, as shown in FIG. 1G, the etching resist films 12, 14, and 16 are removed.

(h) Second Glass Etching

Figure 1H:

Next, as shown in FIG. 1H, the glass substrate 10 in which the concaves are formed is immersed in a hydrofluoric acid solution and further undergoes isotropic etching. When the glass substrate 10 having the concaves of a 150 µm diameter formed therein underwent isotropic etching for about 420 minutes, the concaves were grown to each have a diameter of 600 µm and a depth of about 74 µm.

In this case, in order to prevent a reduction in the thickness of the glass substrate 10, an etching resist film, such as a photoresist or metallic film, may be formed on the back surface of the glass substrate 10 opposite the surface on which the concaves are formed.

In the above-described process for fabricating the glass master matrix, fine openings are formed in the chrome film by reactive ion etching. However, a method for forming the fine openings is not limited thereto. The chrome film may be irradiated with a laser beam, which is an electromagnetic wave, so that fine openings are formed therein through application of heat and evaporation.

A laser beam is a parallel pencil of rays of uniform phase and is monochromatic radiation. Because of such characteristics of a laser beam, a laser beam converged through a lens produces a high energy density. The wavelengths of emission lines range from about 2300 angstroms, which is a wavelength of ultraviolet rays, to 0.7 mm, which is a wavelength of sub-millimeter waves, and at least 500 different emission lines exist.

A substance has an energy (wavelength) absorption band. By selecting a laser beam whose wavelength falls within the wavelength absorption band of a certain substance, the substance can be heated (as in the case of, for example, a laser marker or laser knife). Through utilization of the fact that the chrome film and the glass substrate are different in wavelength absorption band, fine openings can be formed in the etching resist film at positions corresponding to lenslets while the glass substrate is held undamaged.

A process for fabricating a mother matrix by use of the glass master matrix of FIG. 1H will next be described with reference to FIGS. 3A to 3E. A metallic material for the mold may be Ni or Ni alloy. In the following description, Ni is used as a material for the mold.

[2] Fabrication of Mother Matrix (a) Application and Drying of Parting Agent

Figure 3A:
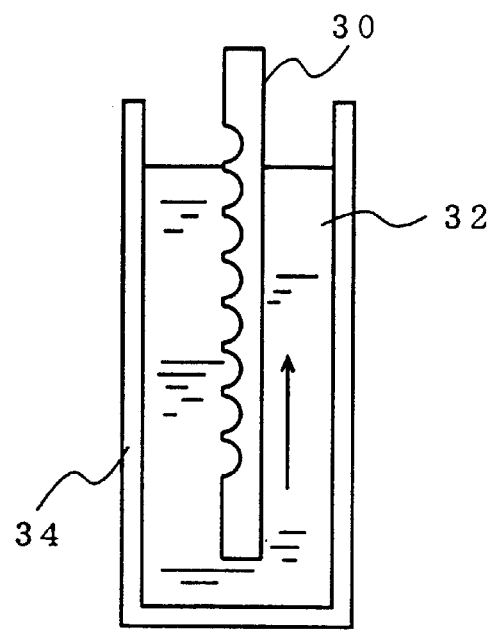
FIGS. 3A to 3E are views depicting the steps of a process for fabricating a mother matrix.

As shown in FIG. 3A, a glass master matrix 30 is immersed in a fluoric parting agent 32 contained in a tank 34, thereby applying the parting agent 32 onto the surface of the glass master matrix 30 in the form of a monomolecular layer. The parting agent 32 facilitates the parting of the glass master matrix 30 in a later parting step in order to prevent breakage of the glass master matrix 30. The applied parting agent 32 is dried.

(b) Dropping of Resin

Figure 3B:
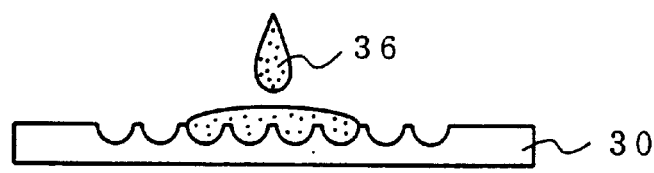

As shown in FIG. 3B, by use of a dispenser, a resin 36 is dropped onto the glass master matrix 30 such that air is not caught in the dropped resin 36 in the form of bubbles.

The resin 36 to be used is a UV-during resin having the following properties. Cure shrinkage: not greater than 6%; viscosity: 100 to 2000 cP (at 25° C.); hardness after curing: 1 to 5H; and bonding strength: 5 kg/6 mm diameter (glass/glass, 100 µm thick).

In place of a UV-curing resin, a thermosetting resin or a two-part system resin may be used.

(c) Spreading of Resin and UV Curing

Figure 3C:
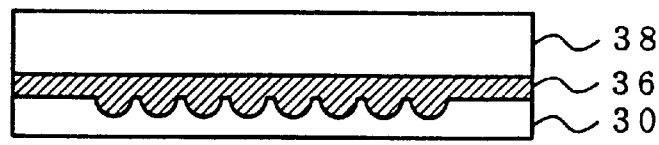

As shown in FIG. 3C, a glass substrate 38 is placed on the dropped UV-curing resin 36 so as to spread the resin 36. The glass substrate 38 has good flatness and has a thickness of at least 0.3 mm so as not to deform when a stress is generated therein during Ni plating, which will be described later.

Specifically, the glass substrate 38 is lowered from above the resin 36. After the glass substrate 38 comes into contact with the resin 36, pressure is applied to the glass substrate 38 so as to spread the resin 36. The pressure to be applied depends on the thickness of a portion of the spread resin 36 other than a lens pattern portion. When the portion is to have a thickness of 5 to 10 µm, the applied pressure is preferably 50 to 100 kg/cm$^2$. In order to prevent air from being caught in the resin 36 in the form of bubbles during spreading, the glass substrate 38 is pressed at a rate of not greater than 10 µm/sec.

In order to cure the resin 36, the thus-obtained sandwich body is irradiated with UV light having a wavelength of 300 to 400 nm and an energy of 4000 mJ/cm$^2$.

(d) Parting

Figure 3D:
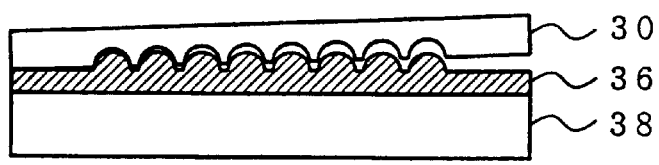
Figure 3E:

Next, as shown in FIG. 3D, a peripheral portion of the glass master matrix 30 is opened apart so that the glass master matrix 30 is parted from the resin 36 through introduction of air therebetween, thereby obtaining a mother matrix 40 as shown in FIG. 3E.

A process for fabricating an Ni mold by use of the thus-fabricated mother matrix 40 will next be described with reference to FIGS. 4A to 4C.

[3] Fabrication of Ni Mold (a) Formation of Conductive Film

Figure 4A:
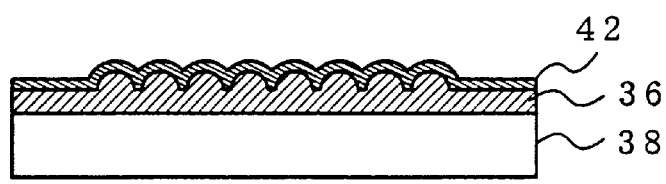
FIGS. 4A to 4C are views depicting the steps of a process for fabricating an Ni mold by use of the mother matrix.

As shown in FIG. 4A, a conductive film 42 is formed on the resin 36 of the mother matrix 40. The conductive film 42 can be formed by, for example, electroless Ni plating.

(b) Fabrication of Ni Mold

Figure 4B:
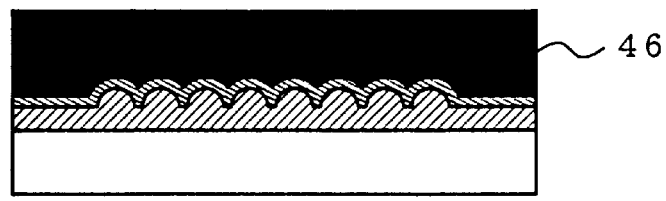
Figure 5:
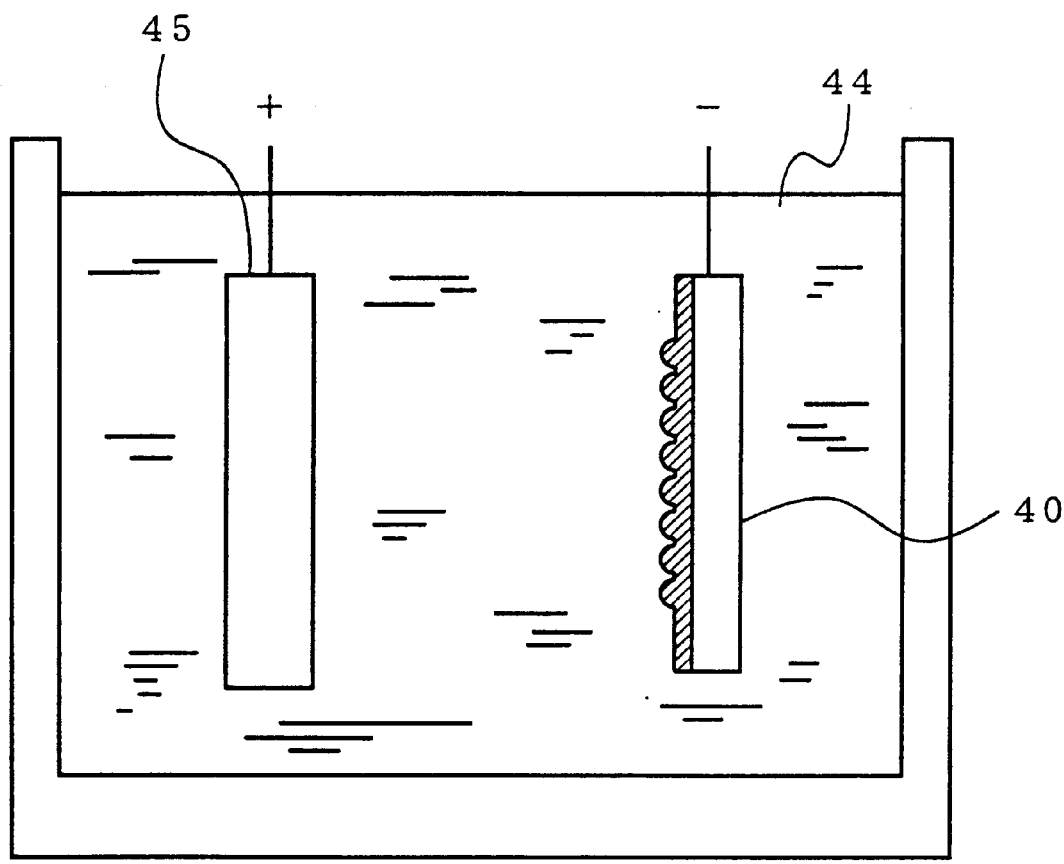
FIG. 5 is a view depicting an Ni plating method.

As shown in FIG. 4B, the conductive film 42 is plated with Ni. This plating is performed in the following manner. As shown in FIG. 5, an electrolyte (Ni plating solution) 44 is heated to an appropriate temperature and is held at the temperature. An Ni pellet to be electrodeposited is connected to an anode side, while the mother matrix 40, which is an object of electrodeposition (plating), is connected to a cathode side. When current is applied, Ni on the anode side is dissolved into the electrolyte 44 and is deposited on the cathode side. As a result, a Ni plating 46 is formed on the conductive film 42 of the mother matrix 40. In order to maintain rigidity as a mold during injection molding, the thickness of the Ni plating 46 is rendered not less than 0.3 mm.

(c) Parting and Peripheral Machining

Figure 4C:
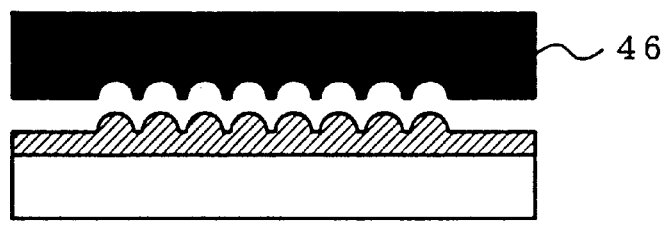

Next, as shown in FIG. 4C, the Ni plating 46 is parted from the mother matrix 40. In order to prepare the Ni plating 46 for attachment to a die set so as to be used as a mold for injection molding, the Ni plating 46 undergoes peripheral machining, such as chamfering or beveling.

A process for fabricating the Ni mold is not limited to the above-described process. The Ni mold may be fabricated in the following manner. A conductive film of Ni is formed by electroless plating on the surface of the glass master matrix 30 on which concaves are formed. The obtained glass master matrix 30 plated with Ni is used as a mother matrix and undergoes the above-described steps (b) and (c), thereby fabricating the Ni mold through Ni plating.

A process for fabricating a lens plate by use of the thus-fabricated Ni mold will next be described with reference to FIGS. 6A and 6B.

[4] Injection Molding (a) Attachment of Molds

Figure 6A:
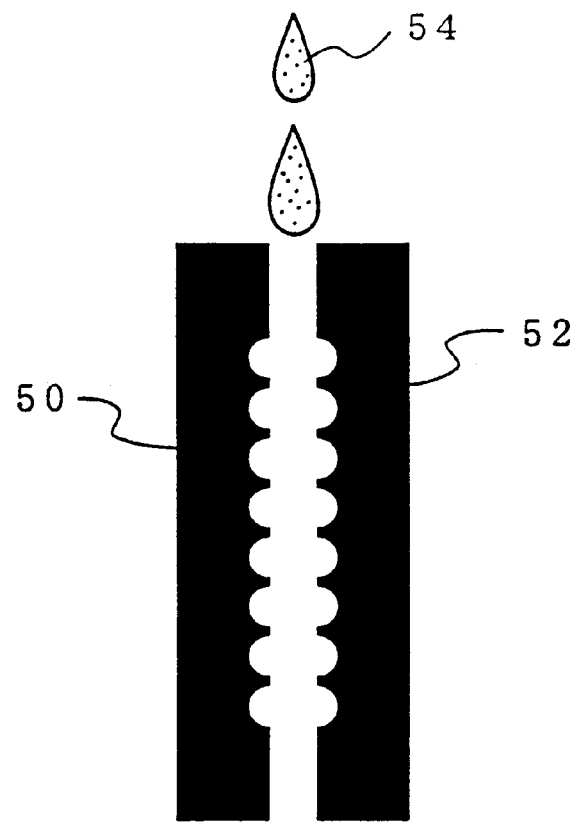
FIGS. 6A and 6B are views depicting the steps of a process for fabricating a lens plate by injection molding through use of the Ni molds.

As shown in FIG. 6A, the two Ni molds fabricated by the above-described process are attached to a die set (not shown) such that the patterned surfaces thereof face each other. A mold 50 is set stationary, whereas other mold 52 is set movable. In this case, a tolerance for misalignment (including a rotational misalignment) between the facing patterned surfaces is ±50 µm, and a tolerance for a gap between the two Ni molds is ±50 µm. The position of the attached movable mold 52 is adjusted so as to satisfy the tolerances.

(b) Injection Molding

A molding resin 54 is injected into a gap formed between the two molds attached to the die set. The molding resin 54 is an acrylic resin, and heat resistance thereof can be selected as appropriate. Resin temperature is set to about 250° C. (preferably not higher than 250° C.; at a resin temperature in excess of 250° C., the molding resin 54 discolors). Mold temperature is set to about 80° C. (preferably not higher than 100° C.; at a mold temperature in excess of 100° C., the mold deforms).

Figure 6B:
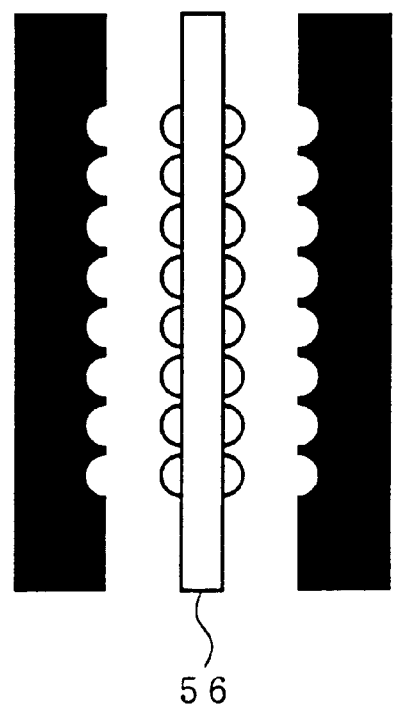

Upon completion of mold injection in step (b), as shown in FIG. 6B, the molds are parted, and a molded lens plate 56 is taken out. In the case of injection molding, the lens plate 56 is rarely molded as intended, but warps convexly to either side.

Figure 7:
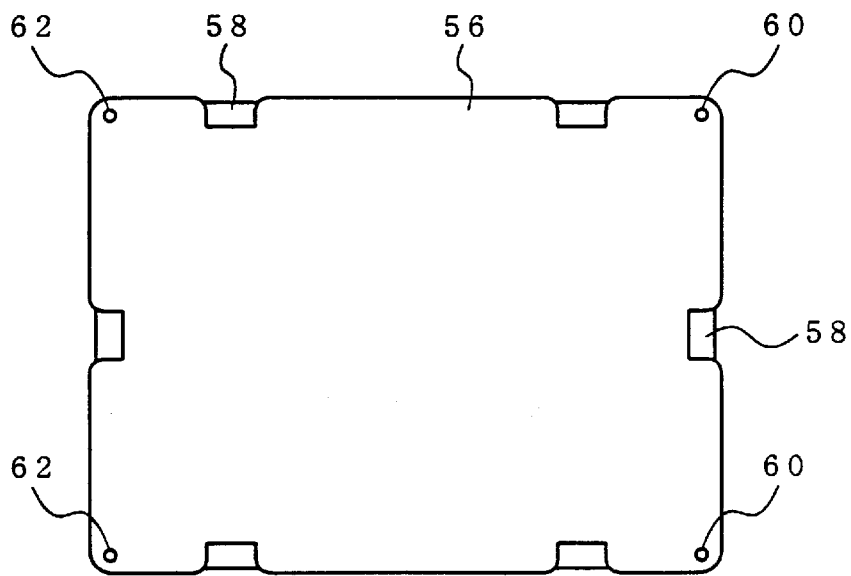
FIG. 7 is a plan view of a lens plate fabricated by injection molding.

FIG. 7 is a plan view showing an example lens plate 56 fabricated by injection molding. A lens pattern portion is not illustrated. The lens plate 56 assumes a rectangular shape measuring 140 mm×110 mm. Within this rectangular region, lenslets are arrayed. Each of the lenslets has a diameter of about 600 µm, a height of about 74 µm, and a curvature radius of about 647 µm. The thickness of the lens plate 56 is about 1.74 mm, and the thickness of the lenslet (distance between the apexes of opposite lenslets) is about 1.88 mm. A thin clipping portion 58 is provided at 6 peripheral positions of the lens plate 56. Two engagement spigots 60 and two engagement sockets 62 for alignment use are provided at four corners on each side of the lens plate 56. The positional accuracy of the engagement spigots 60 and sockets 62 is ±100 µm. The clipping portions 58 and the engagement spigots 60 and sockets 62 are simultaneously molded during the injection molding of the lens plate 56.

In the above embodiment, the injection-molded lens plate 56 has hemispherical lenslets formed on both sides thereof. When a lens plate having hemispherical lenslets formed on a single side thereof is to be molded, one mold is replaced with a flat metallic plate which does not have concaves formed therein. The flat metallic plate may be an Ni plate, for example.

Figure 8A:
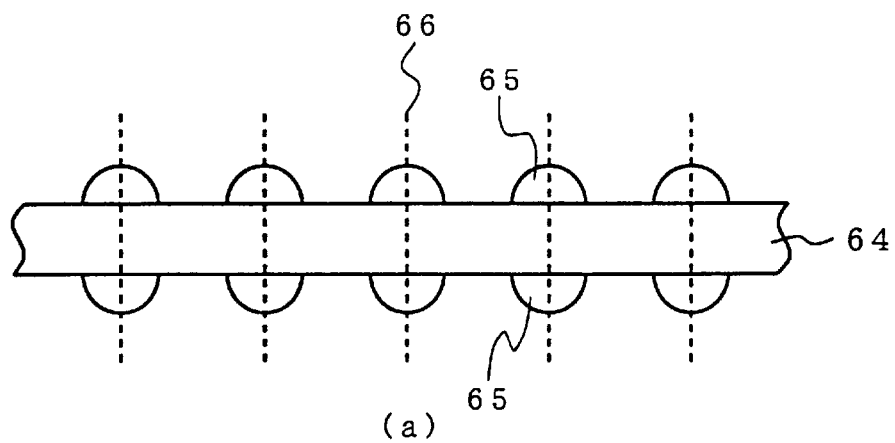
FIGS. 8A and 8B are views illustrating arrays of lenslets.
Figure 8B:
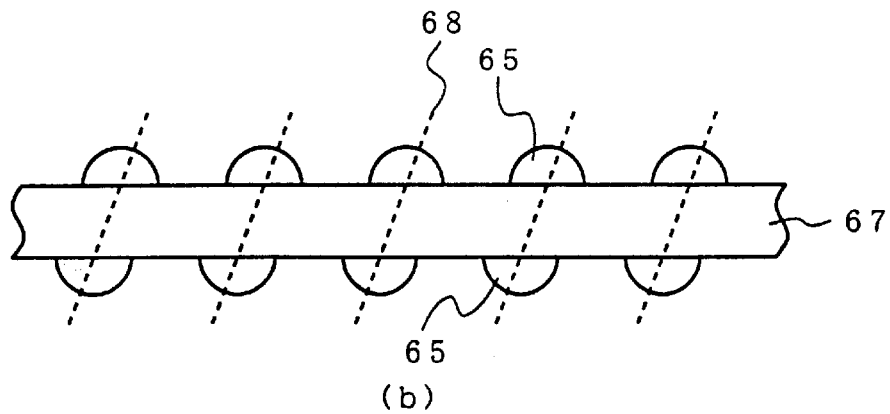

FIGS. 8A and 8B each show an array of hemispherical lenslets of a lens plate which has hemispherical lenslets formed on both sides thereof. FIG. 8A shows an array of hemispherical lenslets 65 in which optical axes 66 of the opposite hemispherical lenslets 65 are aligned in a direction perpendicular to a plane of the lens plate 64. FIG. 8B shows an array of the hemispherical lenslets 65 in which the optical axes 66 of the opposite hemispherical lenslets 65 are aligned in an inclined direction in relation to a plane of the lens plate 64.

Preferably, the lens plate 64 is coated with an antireflection film on a side where the hemispherical lenslets 65 are formed. The antireflection film may be an SiO$_2$ film formed by, for example, sputtering, vapor deposition, or immersion.

Preferably, the lens plate 64 is coated with an anti-water absorption film on a side where the hemispherical lenslets 65 are formed. The anti-water absorption film may be a TiO$_2$ or ITO film formed by, for example, sputtering, vapor deposition, or immersion.

The antireflection film and the anti-water absorption film must have a refractive index smaller than that of a material for the lens plate 64.

A process for assembling two lens plates into a lens array will next be described.

[5] Assembly

A procedure for stacking lens plates will be described. As mentioned previously, an injection-molded lens plate involves molding shrinkage.

In order to correct a warp of each lens plate and assemble an erect image, unity magnification, resin lens array which is free of image distortion, two lens plates 66 and 67 are stacked such that convexly warped sides thereof face each other or face in the same direction as shown in FIGS. 9A and 9B. In the case where the convexly warped sides face in the same direction, stacking must be such that the convexly warped side of the lens plate whose warp is greater than that of the other lens plate faces the concavely warped side of the other lens plate. This arrangement prevents formation of a gap between the stacked lens plates.

The thus-stacked lens plates 66 and 67 are secured by clipping at peripheral positions thereof, which will be described later. Thus, the warps of the lens plates 66 and 67 are corrected.

In order to assemble lens plates having molding shrinkage into an erect image, unity magnification, resin lens array free of image distortion, the following must be considered. As shown in FIG. 10, molding shrinkage of a lens plate is distributed substantially symmetrically with respect to a direction (represented by arrow C) of resin injection from a gate (not shown). In other words, in FIG. 10, when letter D represents a center axis of a passage of an injected resin, molding shrinkage is distributed substantially symmetrically with respect to the axis D (represented by the dashed line). FIG. 10 shows the direction and magnitude of molding shrinkage by arrows.

Since molded lens plates exhibit a substantially similar magnitude of molding shrinkage, the optical axes of stacked hemispherical lenslets can be aligned by stacking two lens plates in appropriate orientation.

In FIG. 6B, lens plates molded by use of the same molds are stacked such that gate positions thereof are located on the same side, i.e., directions of resin injection thereof are aligned. Such a way of stacking nullifies the influence of molding shrinkage, so that a unity magnification, erect image can be obtained. Other way of stacking suffers the influence of molding shrinkage. Specifically, in the two stacked lens plates, the optical axes of stacked hemispherical lenslets are not aligned; as a result, an image is distorted, resulting in a failure to obtain a unity magnification, erect image.

In order to implement an erect image, unity magnification lens array by means of two stacked lens plates, the optical axes of at least three stacked hemispherical lenslets must be aligned. Accordingly, one lens plate has hemispherical lenslets formed on both sides thereof, whereas the other lens plate has hemispherical lenslets formed on at least a single side. In order to align the optical axes of at least three stacked hemispherical lenslets, the two lens plates must be stacked in an aligned manner. To achieve alignment between the two stacked lens plates, the two engagement spigots 60 and two engagement sockets 62 for alignment use are provided at four corners on each side of each lens plate. Through engagement of the spigots 60 and the corresponding sockets 62, the two lens plates can be stacked in an aligned manner.

Figure 11:
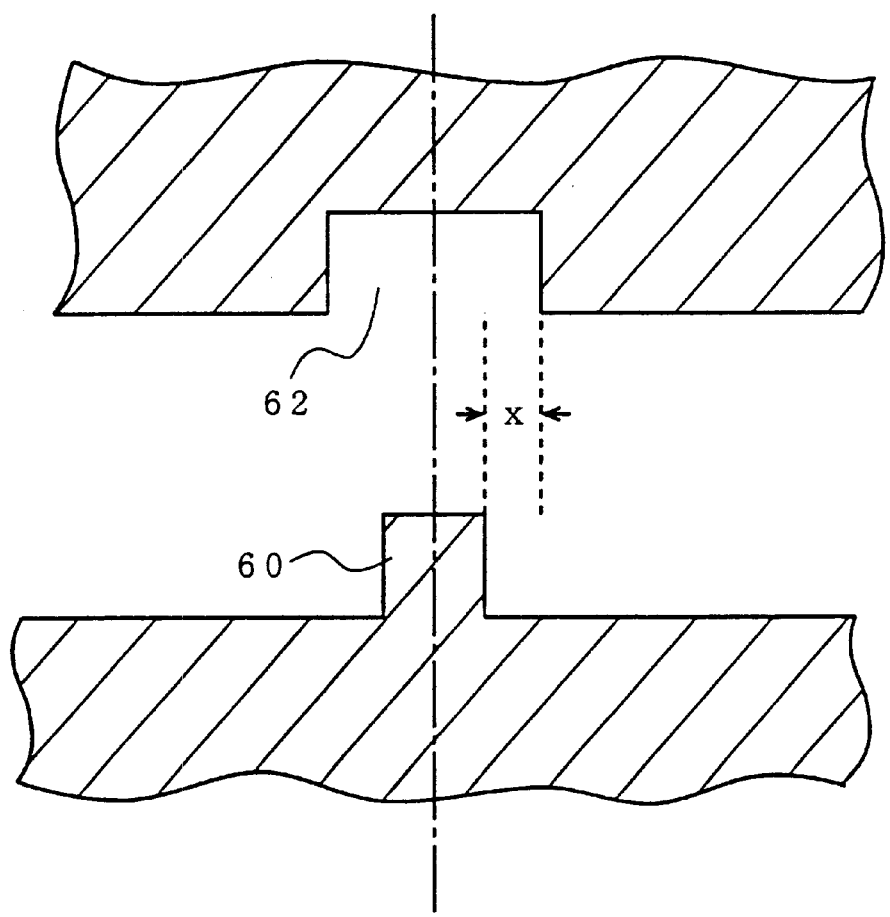
FIG. 11 is an explanatory view illustrating clearance between an engagement socket and engagement spigot.

As shown in FIG. 11, the diameter of the spigot 60 and the diameter of the socket 62 may be selected such that, when the spigot 60 and the socket 62 are engaged, a clearance x is left therebetween, thus performing rough alignment.

Subsequently, fine alignment may be performed through adjustment within the clearance x so that the optical axes of the two lens plates are aligned. In this case, the clearance x is selected such that adjustment can be completed within a range corresponding to a single lenslet.

Figure 12A:
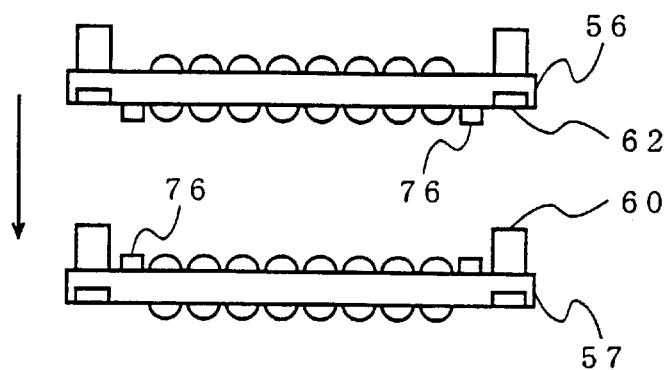
FIGS. 12A to 12C are views depicting the steps of a procedure for assembling two lens plates into a lens array.

FIG. 12A shows the two lens plates 56 and 57 to be stacked. The lens plates 56 and 57 each have protuberances 76 provided in a region other than a region of hemispherical lenslets. The height of the protuberances 76 is substantially equal to that of the hemispherical lenslets. The protuberances 76 are adapted to adjust the distance between the apexes of facing hemispherical lenslets. When the distance between the apexes of facing hemispherical lenslets becomes equal to or greater than one-tenth of a lenslet diameter, an image is deteriorated. Therefore, adjustment of the distance between the apexes of facing lenslets is very important.

Figure 12B:
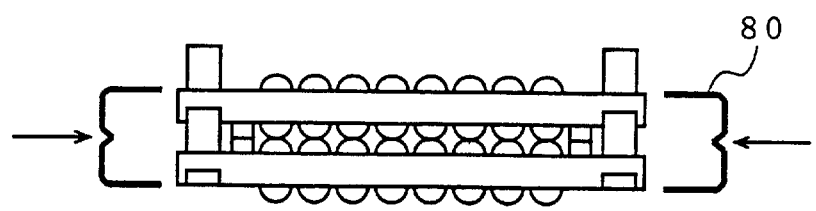
Figure 12C:
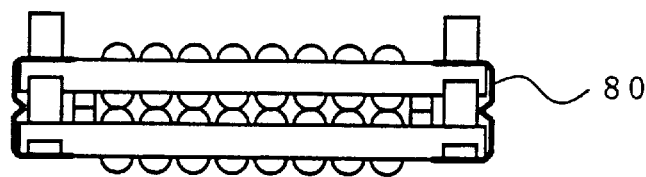

After the lens plates 56 and 57 are stacked and aligned through engagement of the spigots 60 and the sockets 62, clips 80 of an iron material are fitted to the clipping portions 58 as shown in FIG. 12B so as to secure the lens plates 56 and 57 as shown in FIG. 12C. Since the height of the protuberances 76 is substantially equal to that of hemispherical lenslets, the apexes of hemispherical lenslets contact each other.

Next will be described an example in which the two lens plates 56 and 57 are stacked while a colored spacer is interposed therebetween.

Figure 13A:
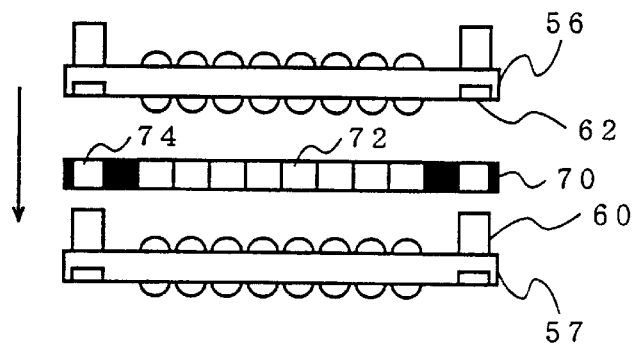
FIGS. 13A to 13C are views depicting the steps of a procedure for assembling two lens plates into a lens array while a colored plate is sandwiched therebetween.

As shown in FIG. 13A, the two lens plates 56 and 57 are stacked while a colored spacer 70 of metal or resin is interposed therebetween openings 72 corresponding to hemispherical lenslets and openings 74 corresponding to the engagement spigots 60 are formed in the colored spacer 70. The colored spacer 72 is intended: (1) to shut off stray light which would otherwise pass through a region other than hemispherical lenslets; (2) to hold the distance between the lens plates 56 and 57 to thereby adjust the distance between the apexes of facing lenslets; (3) to contribute to the correction of a warp of the lens plates 56 and 57; and (4) to align the two lens plates 56 and 57. The thickness of the colored spacer 70 is substantially equal to a value two times the hemispherical-lenslet height. The colored spacer 70 is colored black and mat.

Figure 13B:
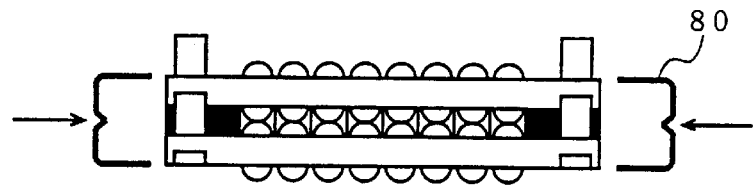
Figure 13C:
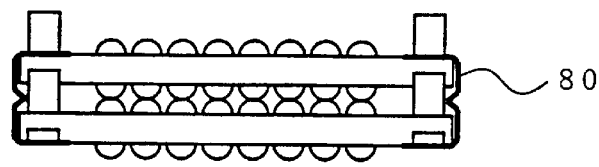

The two lens plates 56 and 57 are aligned through engagement of the spigots 60 and the sockets 62 while the colored spacer 70 is interposed therebetween. Next, the clips 80 are fitted to the corresponding clipping portions 58 as shown in FIG. 13B, thereby securing the lens plates 56 and 57 as shown in FIG. 13C. As a result, the distance between the apexes of facing hemispherical lenslets of the lens plates 56 and 57 is held constant.

Further, in the case where the thickness of the colored spacer is smaller than a value two times the height of a hemispherical lenslet, clipping two lens plates at peripheral edges involves the following problem. Since the total height of facing hemispherical lenslets of the two lens plates becomes greater than the gap between facing peripheral portions of the two lens plates stacked with the colored spacer interposed therebetween, the two lens plates warp while the peripheral edges of the hemispherical-lenslet regions thereof serve as fulcrums. As a result, the distance between facing hemispherical lenslets fails to be held constant in central portions of the hemispherical-lenslet regions of the two lens plates. Therefore, it is important to provide protuberances at peripheral portions of the lens plates so that the gap between facing peripheral portions of the two lens plates stacked with the colored spacer interposed therebetween assumes a value about two times the height of a hemispherical lenslet.

Since a coefficient of thermal expansion differs between the resin lens plates and the colored spacer interposed between the resin lens plates, a resultant stress is generated. Such stress causes misalignment between the optical axes of stacked hemispherical lenslets and is thus undesirable. Therefore, a coefficient of thermal expansion of the colored spacer must be selected so as to meet the following expression.

$$\alpha 2 \leq \alpha 1 + 0.5 \times P/(T \times L)$$

where $\alpha 1$ is a coefficient of thermal expansion of a material for the lens plate; $\alpha 2$ is a coefficient of thermal expansion of a materiel for the colored spacer; L is a longitudinal length of the lenslet region of the lens plate; P is a minimum pitch of lenslets; T is a working temperature range; and a coefficient of 0.5 is intended to align the optical axis of a hemispherical lenslet with the center of an opening formed in the colored spacer at one longitudinal end of the lenslet region and to render an offset of the optical axis of a hemispherical lenslet from the center of an opening formed in the colored spacer not greater than half pitch at the other longitudinal end of the lenslet region.

For example, in the case of coefficient al of thermal expansion of the lens plate=$7 \times 10^{-5}$ (acrylic), longitudinal length L=120 mm, lenslet pitch P=0.6 mm, and working temperature range T=30° C., a material for the colored spacer may be selected such that coefficient $\alpha 2$ of thermal expansion thereof conforms to the expression "$\alpha 2 \leq 1.53 \times 10^{-4}$." Such a material is, for example, stainless steel ($\alpha 1 \leq 1.28 \times 10^{-6}$).

In the above embodiment, the lens plates are secured only by clipping. However, an adhesive may be additionally used. In this case, the adhesive (solvent acceptable) is introduced into the engagement sockets. The engagement sockets and the corresponding engagement spigots are engaged to align two lens plates. Then, the engaged portions of the lens plates are pressed so as to temporarily secure the lens plates. The clips 80 are fitted to the clipping portions 18, thereby securing the two lens plates. When clipping and bonding are used cooperatively for securing the two lens plates, the lens plates and the colored spacer must not be bonded.

Figure 14:
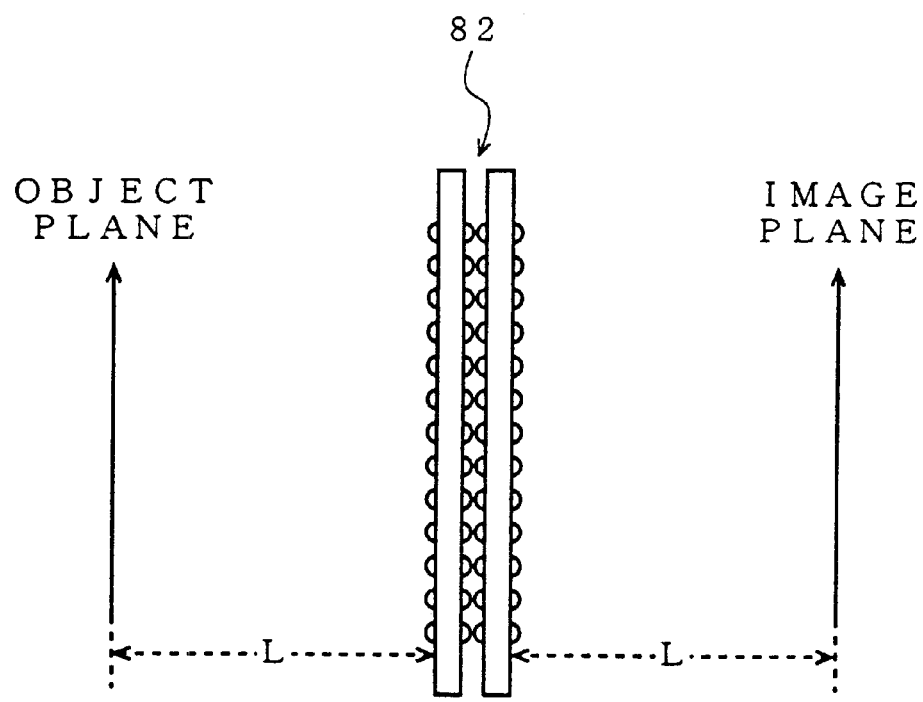
FIG. 14 is a view illustrating a spatial transmission of an image through an erect image, unity magnification, resin lens array.

FIG. 14 shows a spatial transmission of an image lying in an object plane onto an image plane through an erect image, unity magnification, resin lens array 82 fabricated according to the present invention. Letter L represents a spatial distance.

Figure 15:
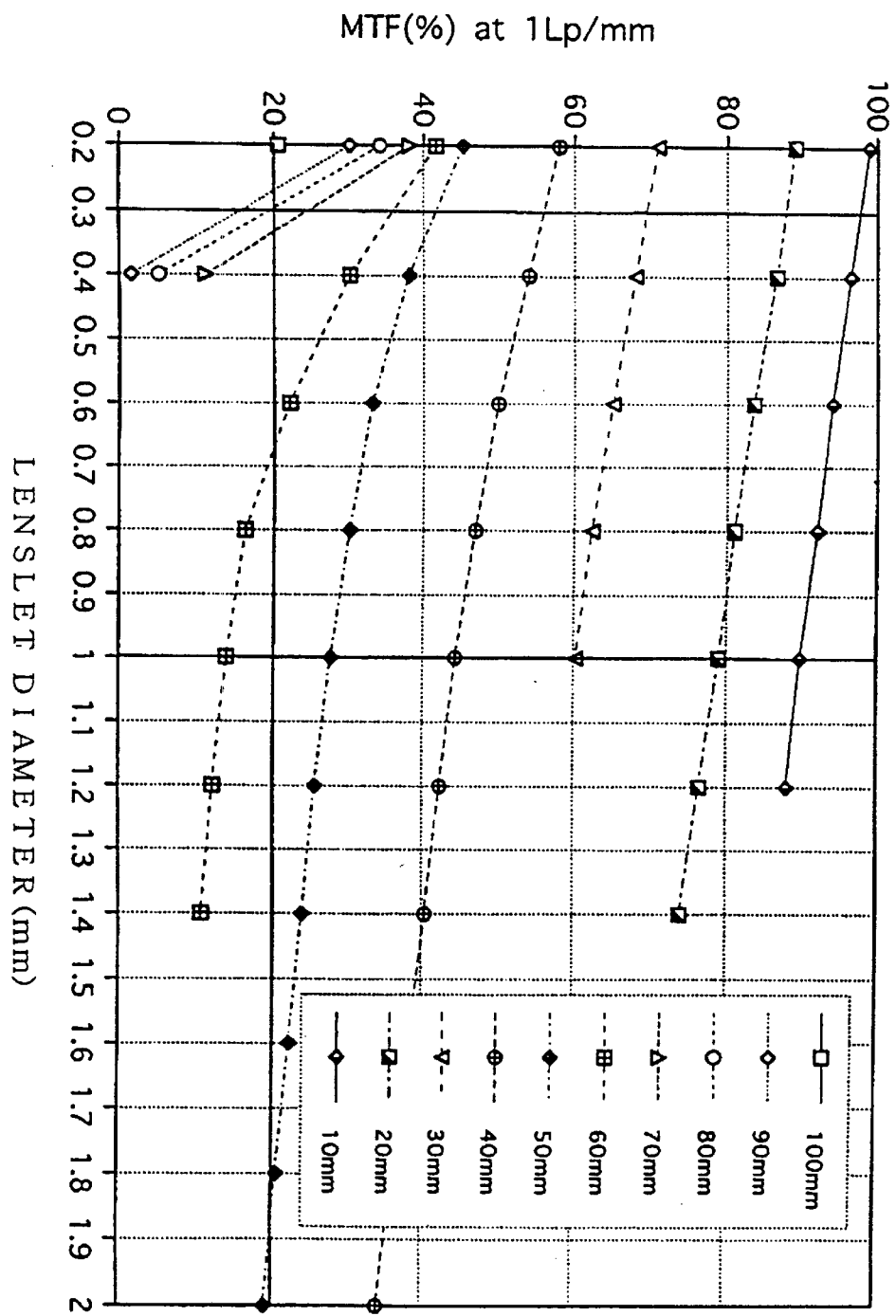
FIG. 15 is a graph showing an MTF characteristic of the erect image, unity magnification, resin lens array of the present invention.

FIG. 15 shows MTF (Modulation Transfer Function), an optical property, of the erect image, unity magnification, resin lens array as measured by use of a rectangular wave having a spatial frequency of 1 Lp/mm while spatial distance L is varied from 10 mm to 100 mm in units of 10 mm. An MTF of 20% is a limit sensible by human. As seen from FIG. 15, an erect image, unity magnification, resin lens array having a lenslet diameter of 0.3 mm to 1.0 mm and a spatial distance of 20 mm to 100 mm exhibits a good MTF value. Therefore, the erect image, unity magnification, resin lens array of the present invention provides an image of good quality lying in an image plane.

The embodiments of the present invention have been described above. However, it will be apparent to those skilled in the art that the invention is not limited thereto, but may be varied or modified without departing from the scope of the invention.

Industrial Applicability

According to the present invention, two lens plates are fabricated by injection molding and are assembled into an erect image, unity magnification, resin lens array, whereby erect image, unity magnification, resin lens arrays of uniform quality can be readily manufactured at low cost.

What is claimed is:

1. A method for manufacturing a lens plate which has hemispherical lenslets arrayed in a regular pattern on at least one sides thereof, comprising the steps of:

applying a parting agent onto a surface of a master matrix of glass on which concaves are formed, followed by drying;

dropping resin onto the surface of the master matrix on which concaves are formed;

spreading the dropped resin by pressing a substrate having parallel, flat surfaces against the dropped resin;

curing the spread resin;

parting the master matrix;

forming a conductive film on the cured resin;

depositing metal on the conductive film to a predetermined thickness by plating;

parting the resultant metal plating from the cured resin to thereby obtain a mold having concaves formed therein;

attaching the mold having concaves formed therein and a flat-surface mold onto a die set such that the concaves and the flat surface face each other;

establishing a predetermined gap between the facing molds and injecting resin into the gap; and opening the molds apart to remove the lens plate.

2. A method for manufacturing a lens plate, which has hemispherical lenslets arrayed in a regular pattern on at least one sides thereof, comprising the steps of:

forming a conductive film on a surface of a master matrix of glass on which concaves are formed;

depositing metal on the conductive film to a predetermined thickness by plating;

parting the resultant metal plating from the master matrix to thereby obtain a mother matrix;

forming a parting layer on the mother matrix and depositing metal on the parting layer to a predetermined thickness by plating;

parting the resultant metal plating from the mother matrix to thereby obtain a mold having concaves formed therein;

attaching the mold having concaves formed therein and a flat-surface mold onto a die set such that the concaves and the flat surface face each other;

establishing a predetermined gap between the facing molds and injecting resin into the gap; and opening the molds apart to remove the lens plate.

3. A method for manufacturing a lens plate which has hemispherical lenslets arrayed in a regular pattern on both sides thereof, comprising the steps of:

a) applying a parting agent onto a surface of a master matrix of class on which concaves are formed, followed by drying;

b) dropping resin onto the surface of the master matrix on which concaves are formed;

c) spreading the dropped resin by pressing a glass substrate having parallel, flat surfaces against the dropped resin;

d) curing the spread resin;

e) parting the master matrix;

f) forming a conductive film on the cured resin;

g) depositing metal on the conductive film to a predetermined thickness by plating;

h) parting the resultant metal plating from the cured resin to thereby obtain a first mold having concaves formed therein;

i) repeating steps g) and h) to thereby obtain a second mold having concaves formed therein j) attaching the first and second molds, each having concaves formed therein, onto a die set such that surfaces having the concaves formed therein face each other;

k) establishing a predetermined gap between the facing molds and injecting resin into the gap; and l) opening the molds apart to remove the lens plate.

4. A method for manufacturing a lens plate, which has hemispherical lenslets arrayed in a regular pattern on both sides thereof, comprising the steps of:

a) forming a conductive film on a surface of a master matrix of glass on which concaves are formed;

b) depositing metal on the conductive film to a predetermined thickness by plating;

c) parting the resultant metal plating from the master matrix to thereby obtain a mother matrix;

d) forming a parting layer on the mother matrix and depositing metal on the parting layer to a predetermined thickness by plating;

e) parting the resultant metal plating form the mother matrix to thereby obtain a first mold having concaves formed therein;

f) repeating steps d) and e) to thereby obtain a second mold having concaves formed therein;

attaching the first and second molds, each having concaves formed therein, onto a die set such that surfaces having the concaves formed therein face each other;

establishing a predetermined gap between the facing molds and injecting resin into the gap; and opening the molds apart to remove the lens plate.

5. A method for manufacturing a lens plate according to any of claims 1–4, wherein the master matrix is manufactured by the steps of;

preparing a glass substrate having substantially parallel, flat surfaces;

forming an etching resist film on the glass substrate;

forming fine openings corresponding to the hemispherical lenslets in the etching resist film in a regularly arrayed pattern;

isotropically etching the glass substrate while the etching resist film is used as a mask, thereby forming concaves in the glass substrate under the corresponding fine openings;

removing the etching resist film; and further isotropically etching the glass substrate so that the concaves grow and assume a profile corresponding to that of the hemispherical lenslet.

6. A method for manufacturing a lens plate according to claim 5, wherein, in the step for forming the fine openings in the etching resist film in a regularly arrayed pattern, portions of the etching resist film which correspond to the fine lenslets are irradiated with an electromagnetic wave so as to be heated and evaporated.

7. A method for manufacturing a lens plate according to claim 6, wherein an etching resist film is formed on a back surface of the glass substrate before the second isotropic etching is carried out.

8. A method for manufacturing a lens plate according to any of claim 1–4 wherein the master matrix is manufactured by the steps of:

preparing a glass substrate having substantially parallel, flat surfaces;

forming a metallic film on the glass substrate;

applying a photoresist onto the metallic film;

pattering the photoresist;

etching the metallic film while the patterned photoresist is used as a mask, thereby forming fine openings corresponding to the hemispherical lenslets in the metallic film in a regularly arrayed pattern;

removing the photoresist;

isotropically etching the glass substrate while the metallic film is used as a mask, thereby forming concaves in the glass substrate under the corresponding fine openings;

removing the metallic film; and further isotropically etching the glass substrate so that the concaves grow and assume a profile corresponding to that of the hemispherical lenslet.

9. A method for manufacturing a lens plate according to claim 8, wherein an etching resist film is formed on a back surface of the glass substrate before the second isotropic etching is carried out.

10. A method for manufacturing a lens plate according to any of claims 1–4, wherein the master matrix is manufactured by the step of:

preparing a glass substrate having substantially parallel, flat surfaces;

forming a metallic film on the glass substrate;

applying a photoresist onto the metallic film;

patterning the photoresist;

etching the metallic film while the patterned photoresist is used as a mask, thereby forming fine openings corresponding to the hemispherical lenslets in the metallic film in a regularly arrayed pattern;

isotropically etching the glass substrate while the metallic film coated with the photoresist is used as a mask, thereby forming concaves in the glass substrate under the corresponding fine openings;

removing the photoresist and the metallic film; and further isotropically etching the glass substrate so that the concaves grow and assume a profile corresponding to that of the hemispherical lenslet.

11. A method for manufacturing a lens plate according to claim 10, wherein an etching resist film is formed on a back surface of the glass substrate before the second isotropic etching is carried out.

12. A method for manufacturing a lens plate according to any of claim 1–4, wherein the master matrix is manufactured by the steps of:

preparing a glass substrate having substantially parallel, flat surfaces;

forming a metallic film on the glass substrate;

applying a first photoresist onto the metallic film;

patterning the first photoresist;

etching the metallic film while the patterned first photoresist is used as a mask, thereby forming fine openings corresponding to the hemispherical lenslets in the metallic film in a regularly arrayed pattern;

removing the first photoresist;

applying a second photoresist;

exposing the second photoresist to light emitted from behind the glass substrate, through the fine openings formed in the metallic film;

removing exposed portions of the second photoresist by development;

isotropically etching the glass substrate while the metallic film coated with the second photoresist is used as a mask, thereby forming concaves in the glass substrate under the corresponding fine openings;

removing the second photoresist and the metallic film; and further isotropically etching the glass substrate so that the concaves grow and assume a profile corresponding to that of the hemispherical lenslet.

13. A method for manufacturing a lens plate according to claim 12, wherein an etching resist film is formed on a back surface of the glass substrate before the second isotropic etching is carried out.

14. A method for manufacturing a lens plate according to any of claims 1–4, wherein the master matrix is manufactured by the steps of:

preparing a glass substrate having substantially parallel, flat surfaces;

forming a metallic film on the glass substrate;

applying a first photoresist onto the metallic film;

patterning the first photoresist;

etching the metallic film while the patterned first photoresist is used as a mask, thereby forming fine openings corresponding to the hemispherical lenslets in the metallic film in a regularly arrayed pattern;

applying a second photoresist;

exposing the second photoresist to light emitted from behind the glass substrate, through the fine openings formed in the metallic film;

removing exposed portions of the second photoresist by development;

isotropically etching the glass substrate while the metallic film coated with the first photoresist and the second photoresist is used as a mask, thereby forming concaves in the glass substrate under the corresponding fine openings;

removing the first photoresist, the second photoresist, and the metallic film; and further isotropically etching the glass substrate so that the concaves grow and assume a profile corresponding to that of the hemispherical lenslet.

15. A method for manufacturing a lens plate according to claim 14, wherein an etching resist film is formed on a back surface of the glass substrate before the second isotropic etching is carried out.

\* \* \* \* \*

UNITED STATES PATENT AND TRADEMARK OFFICE
CERTIFICATE OF CORRECTION

PATENT NO. : 6,625,864 B2
DATED : September 30, 2003
INVENTOR(S) : Hiroyuki Nemoto, Takashi Kishimoto and Kenjiro Hamanaka It is certified that error appears in the above-identified patent and that said Letters Patent is hereby corrected as shown below:

Column 6,
Line 57, "The resin 36 to be used is a UV-during" should read -- The resin 36 to be used is a UV-curing --.

Column 10,
Line 31, "interposed therebetween openings" should read -- interposed therebetween. Openings --.

Column 11,
Line 24, "For example, in the case of coefficient a1" should read -- For example, in the case of coefficient $\alpha 1$ --.

Column 12,
Lines 7 and 32, "one sides" should read -- one side --.
Line 57, "matrix of class" should read -- matrix of glass --.

Signed and Sealed this

Twenty-fourth Day of August, 2004

JON W. DUDAS
*Director of the United States Patent and Trademark Office*